June 19, 1973     P. BAETZ     3,740,394
THIAZOLO AND THIAZINO PYRIMIDINES
Filed June 29, 1970
FIG. 1
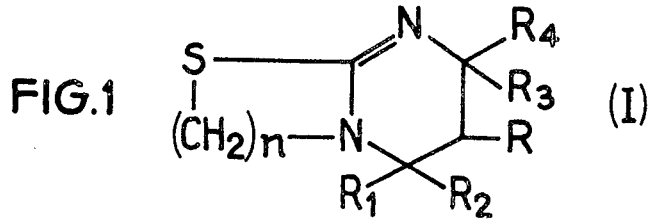
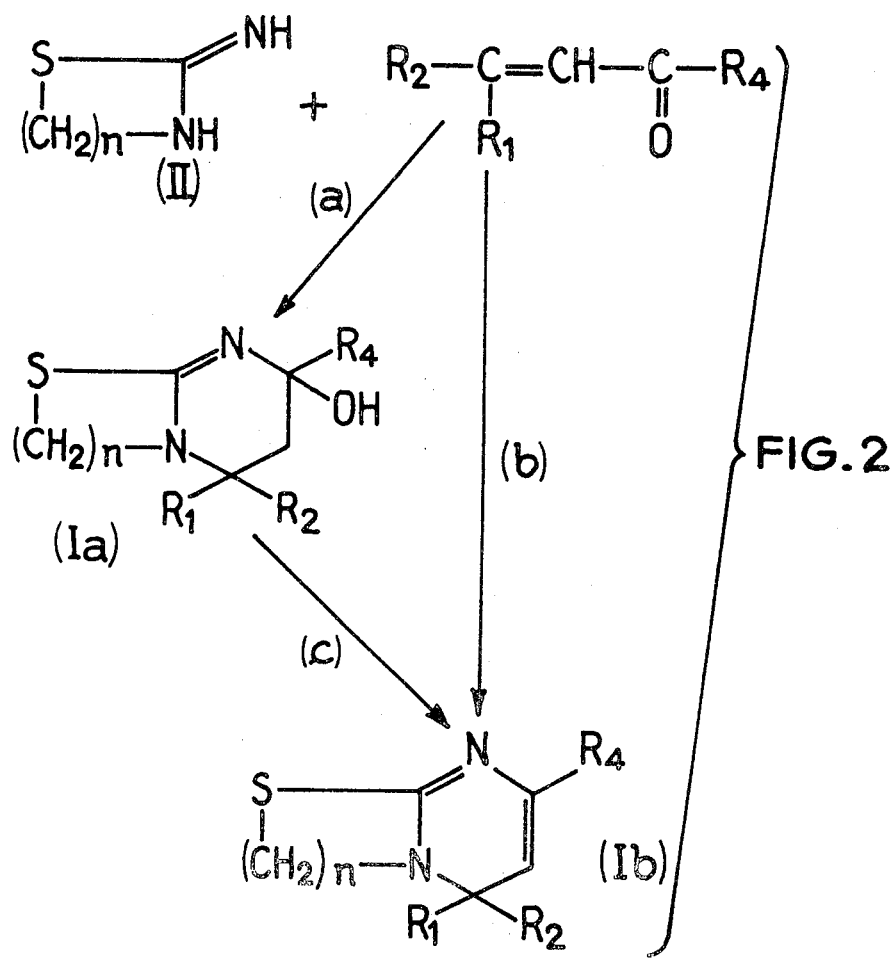
FIG. 2
INVENTOR
PIERRE BAETZ
BY Young + Thompson
ATTYS.

United States Patent Office 3,740,394
Patented June 19, 1973

3,740,394
THIAZOLO AND THIAZINO PYRIMIDINES
Pierre Baetz, Garches, France, assignor to Seperic,
Morat, Fribourg Canton, Switzerland
Filed June 29, 1970, Ser. No. 50,715
Claims priority, application Great Britain, July 3, 1969,
33,646/69
Int. Cl. C09d 51/46
U.S. Cl. 260—243 R                     6 Claims

ABSTRACT OF THE DISCLOSURE

Compounds of formula:

$$\text{(I)}$$

in which $n$ is 2 or 3, R is hydrogen or, together with $R_3$, forms a double bond, $R_1$ is hydrogen or a lower alkyl group, $R_2$ and $R_4$ are each hydrogen, a lower alkyl group, a phenyl group optionally substituted, thienyl or pyridyl, and $R_3$ is hydroxyl or, together with R, forms a double bond. These compounds and their salts are therapeutically active, in particular as antiinflammatory drugs.

---

This invention relates to a family of new chemical compounds endowed with therapeutical, particularly antiinflammatory, properties.

These compounds (I) are those of general formula illustrated in FIG. 1 of the accompanying drawing in which:

$n$ is an integer equal to 2 or 3,
R is hydrogen or, together with $R_3$, forms a double bond,
$R_1$ is hydrogen or a lower alkyl group,
$R_2$ and $R_4$ are each hydrogen, a lower alkyl group, a phenyl group optionally substituted with halogens, nitro, hydroxyl, carboxyl, halosulfonyl, trifluoromethyl, lower alkyl, lower alkoxy, carbalkoxyloweralkyl or lower alkanoylamido, or an aromatic type heterocycle, such as thienyl or pyridyl and
$R_3$ is hydroxyl or forms a double bond with R, and their pharmaceutically acceptable acid addition salts.

In the above definition, by lower alkyl or alkoxy group is meant such a group containing 1–4 carbon atoms. Similarly, the lower carbalkoxyalkyl and alkanoylamido groups are those having 1–4 carbon atoms in their hydrocarbon portion or in each of their hydrocarbon portions.

Thus, according to whether $n$ is 2 or 3, compounds (I) are 5- and/or 7-substituted thiazolino-pyrimidines, or 6- and/or 8-substituted thiazidino-pyrimidines.

To prepare compounds (I), a process such as illustrated in FIG. 2 of the drawing may be used.

This process comprises condensing a sulfur-containing heterocyclic imine (II) of formula:

with an α-unsaturated carbonyl compound (III) of formula:

$$R_2-\underset{R_1}{C}=CH-\underset{O}{\overset{\|}{C}}-R_4$$

in which formulae $n$, $R_1$, $R_2$ and $R_4$ have the above-defined meanings and then, if desired, salifying resulting compound (I).

Imine (II) may be used in free or salt form. In the latter case, the imine is released in situ by an alkaline compound.

This condensation is advantageously carried out in an organic solvent such as acetone, chloroform, ethanol, xylene, or mixtures or two or more thereof.

Depending on the operating conditions used, there are ultimately obtained hydroxyl compounds (Ia) in which $R_3$=OH, or compounds (Ib) resulting from dehydration of the former, in which R and $R_3$ form together a double bond.

According to the route schematically illustrated by (a) in FIG. 2, compounds (Ia) are obtained by carrying out the condensation at low or moderate temperature, such as room temperature.

According to the route schematically illustrated by (b), compounds (Ib) are obtained by carrying out the condensation at higher temperature, advantageously above 70° C.

As condensation is conveniently carried out at the refluxing temperature of the solvent, high boiling solvents, such as ethanol and xylene will be chosen in this case.

On the other hand, it is possible, by action of temperature (route (c)), to pass, by dehydration, from compounds (Ia) to compounds (Ib). For this purpose, a salt, such as the hydrochloride, of compound (Ia) to be dehydrated is advantageously used. This salt is either melted in vacuo, or heated in a high boiling solvent, such as propylene glycol, at the refluxing temperature of said solvent.

The following non-limiting examples are given to illustrate the invention.

EXAMPLE I

Synthesis of 5,7-diphenyl-2,3,5-trihydro-thiazolo(3.2.a)pyrimidine (Formula I: $n$=2, $R_1$=H, $R_2$=$C_6H_5$—, R+$R_3$=double bond, $R_4$=$C_6H_5$; Code No.=523)

Belzalacetophenone (0.2 mole) or chalcone (III: $R_2$=$C_6H_5$—, $R_1$=H, $R_4$=$C_6H_5$) and an ethanol solution of 2-iminothiazolidine (0.2 mole) (II, $n$=2), are introduced in a 250 ml. flask. The reaction mixture is refluxed during 3 hours. After allowing the reaction mixture to rest overnight at room temperature, the resulting crystalline material is suction filtered. It is then recrystallized from ethanol, suction filtered and dried over potassium hydroxide. 16.2 g. of slightly yellow product, M.P.=133–140° C. are obtained.

| Analysis | Total nitrogen | Basic nitrogen |
|---|---|---|
| Calculated, percent | 9.58 | 4.79 |
| Found, percent | 9.54 | 4.78 |

EXAMPLE II

Synthesis of 6,8-diphenyl - 2,3,4,6 - tetrahydro - 1,3 - thiazino(3.2.a)pyrimidine (Formula I: $n$=3, $R_1$=H, $R_2$=$C_6H_5$, R+$R_3$=double bond, $R_4$=$C_6H_5$; Code No.=526)

To 50 ml. of methanol are added 20 g. of 2-iminometathiazine hydrobromide (II: $n$=3) and 5.4 g. of sodium methoxide. The mixture is filtered to remove the resulting sodium bromide. A chloroform solution of benzalacetophenone (III: $R_2$=$C_6H_5$—, $R_1$=H, $R_4$=$C_6H_5$—) is added. The reaction mixture is then stirred during five hours away from light. It is then concentrated in a rotating evaporator and is placed in an ice-bath during two hours. The material is then suction filtered and recrystallized from ethanol-chloroform. 7.2 g. of slightly pink material, M.P. 156° C. are thus obtained.

| Analysis | Total nitrogen | Basic nitrogen |
|---|---|---|
| Calculated, percent | 9.15 | 4.58 |
| Found, percent | 9.01 | 4.61 |

EXAMPLE III

Synthesis of 5-phenyl - 7 - hydroxy-7-(m-trifluoromethyl-phenyl) - 2,3,5,6 - tetrahydro-thiazolo(3.2.a)pyrimidine (Formula I: $n=2$, $R_1=H$, $R_2=C_6H_5$; $R=H$, $R_3=OH$, $R_4=$m-$CF_3$—$C_6H_4$—; Code No. 530)

An acetone solution of 22 g. of benzal-(3'-trifluoromethyl)-acetophenone (III: $R_2=C_6H_5$—, $R_1=H$, $R_4=$m-$CF_3$—$C_6H_4$)

is mixed with an acetone solution of 8 g. of 2-imino-thiazolidine (II: $n=2$). The mixture is stirred and is then allowed to rest overnight. The resulting crystals are then washed with acetone and dried over potassium hydroxide. 20 g. of white product, M.P. 132–141° C., are thereby obtained.

| Analysis | Total nitrogen | Basic nitrogen |
|---|---|---|
| Calculated, percent | 7.40 | 3.70 |
| Found, percent | 7.47 | 3.71 |

EXAMPLE IV

Synthesis of 5-(2'-bromo-phenyl)-7-hydroxy - 7 - phenyl-2,3,5,6-tetrahydro-thiazolo(3.2.a)pyrimidine (Formula I: $n=2$, $R_1=H$, $R_2=$o-Br—$C_6H_4$—, $R=H$, $R_3=OH$, $R_4=C_6H_5$; Code No. 572)

To 100 ml. of acetone are added, with stirring, 14.3 g. of 2-bromo-benzalacetophenone (III: $R_2=$o-Br—$C_6H_4$, $R_1=H$, $R_4=C_6H_5$) and 5.1 g. of 2-imino-thiazolidine (II: $n=2$). Crystallization begins after one hour. Stirring is continued during two days, and the reaction mixture is then left standing 36 hours. It is then suction filtered, washed with acetone and with ether, and dried. 11 g. of product, M.P. 114–117° C., are obtained.

| Analysis | Total nitrogen | Basic nitrogen |
|---|---|---|
| Calculated, percent | 7.19 | 3.59 |
| Found, percent | 7.16 | 3.56 |

EXAMPLE V

Synthesis of 5-phenyl-7-(m-chlorophenyl)-2,3,5-trihydro-thiazolo(3.2.a)pyrimidine (Formula I: $n=2$, $R_1=H$, $R_2=C_6H_5$, $R+R_3=$double bond, $R_4=$m-Cl—$C_6H_4$—; Code No. 542)

(a) Preparation of 5-phenyl-7-hydroxy-7-(m - chloro-phenyl) - 2,3,5,6 - tetrahydro - thiazolo(3.2.a)pyrimidine (Formula I: $n=2$, $R_1=H$, $R_2=C_6H_5$, $R=H$, $R_3=OH$, $R_4=$m-Cl—$C_6H_4$—; Code No. 537).—0.1 mole of benzal-3'-chloroacetophenone (III: $R_2=C_6H_5$, $R_1=H$, $R_4=$m-Cl—$C_6H_4$—)

dissolved in acetone is mixed with 0.1 mole of 2-imino-thiazolidine (II: $n=2$) also dissolved in acetone. The mixture is stirred during one hour and is left standing overnight. The resulting crystals are suction filtered, washed with acetone and then dried. 27 g. of white product, M.P. 125–130° C. are thereby obtained.

| Analysis | Total nitrogen | Basic nitrogen |
|---|---|---|
| Calculated, percent | 8.10 | 4.05 |
| Found, percent | 8.20 | 4.14 |

(b) Preparation of the hydrochloride.—0.15 mole of the hydroxylated product obtained in (a) are suspended in 50 ml. of chloroform and 60 ml. of ethanol. Hydrochloric gas is bubbled through to saturation, and maximum removal of the solvents is then carried out. An oily residue is thereby obtained.

(c) Preparation of 5-phenyl-7-(m-chlorophenyl)-2,3,5-trihydrothiazolo(3.2.a)pyrimidine.—The oily residue obtained in (b) is heated to 230° C. during 45 minutes, in vacuo, in a Darcet alloy bath. It is then allowed to cool in vacuo and is then taken up into 150 ml. of chloroform and excess sodium hydroxide, with stirring. When two liquid phases are formed, the chloroform is decanted and collected and is then dried over sodium sulfate and evaporated to dryness. The residue is taken up into 200 ml. hot methanol. It is then filtered, allowed to cool during 48 hours, suction filtered, washed with alcohol and recrystallized from methanol. 15.5 g. of slightly yellow product, M.P.=95–110° C. are thereby obtained.

| Analysis | Total nitrogen | Basic nitrogen |
|---|---|---|
| Calculated, percent | 8.57 | 4.28 |
| Found, percent | 8.47 | 4.45 |

The constitution and the physical properties of compounds (I) obtained according to the above examples and of other compounds (I) prepared in a similar manner are summarized in the following table. In this table is also reported the anti-inflammatory activity of compounds (I), such as determined by the following test.

Rats are administered a single injection, by the intra-plantar route, of 1 mg. of Carrhagenin in 0.1 ml. of water. The test compound (I) is administered orally at a dosage of 30 to 100 mg./kg., one-half hour prior to the Carrhagenin.

The volume of the rat's paw is measured plethysmometrically two hours after Carrhagenin injection, and is compared with a reference lot which is not administered compound (I).

The activity of compounds (I), i.e., their ability to reduce Carrhagenin induced oedema, is expressed using one to four +'s, four +'s representing maximum anti-inflammatory activity.

| $n$ | $R_1$ | $R_2$ | $R$ | $R_3$ | $R_4$ | Melting point ° C. | Code No. | Anti-inflammatory activity |
|---|---|---|---|---|---|---|---|---|
| 2 | H | $C_6H_5$ | H | OH | $C_6H_5$ | 111–115 | 469 | ++++ |
| 2 | H | $C_6H_5$ | H | OH | H | 160–161 | 481 | + |
| 2 | H | $C_6H_5$ | Double bond | | $C_6H_5$ | 133–140 | 523 | ++++ |
| 3 | H | $C_6H_5$ | Double bond | | $C_6H_5$ | 156 | 526 | ++++ |
| 3 | H | $C_6H_5$ | H | OH | H | 156 | 529 | + |
| 2 | H | $C_6H_5$ | H | OH | m-$CF_3$—$C_6H_4$ | 132–141 | 530 | ++ |
| 2 | $CH_3$ | $CH_3$ | H | OH | $CH_3$ | 145–148 | 531 | + |
| 2 | H | o-Cl—$C_6H_4$ | H | OH | $C_6H_5$ | 111–117 | 532 | + |
| 2 | H | $C_6H_5$ | Double bond | | m-$CF_3$—$C_6H_4$ | 98–103 | 533 | ++ |
| 2 | H | $C_6H_5$ | H | OH | $CH_3$ | 129–134 | 535 | + |
| 2 | H | $C_6H_5$ | H | OH | m-Cl—$C_6H_4$ | 125–130 | 537 | + |
| 2 | H | p-$CH_3O$—$C_6H_4$ | H | OH | $C_6H_5$ | 110–115 | 538 | + |
| 2 | H | $CH_3$ | H | OH | H | 138–140 | 539 | + |
| 2 | H | $C_6H_5$ | Double bond | | m-Cl—$C_6H_4$ | 95–110 | 542 | +++ |
| 2 | H | o-Cl—$C_6H_4$ | Double bond | | $C_6H_5$ | 115–130 | 543 | ++ |
| 2 | H | p-$CH_3O$—$C_6H_4$ | Double bond | | $C_6H_5$ | 105–110 | 545 | ++ |
| 2 | H | p-Cl—$C_6H_5$ | H | OH | $C_6H_5$ | 104–107 | 546 | +++ |
| 2 | H | m-Cl—$C_6H_4$ | H | OH | $C_6H_5$ | 98–100 | 547 | +++ |
| 2 | H | $C_6H_5$ | H | OH | m-$C_2H_5O$—$C_6H_4$ | 100–105 | 551 | + |
| 2 | H | 2'-thienyl | H | OH | $C_6H_5$ | 100–105 | 560 | + |

TABLE—Continued

| n | $R_1$ | $R_2$ | R | $R_3$ | $R_4$ | Melting point °C. | Code No. | Anti-inflammatory activity |
|---|---|---|---|---|---|---|---|---|
| 2 | H | H | H | OH | $CH_3$ | 131–133 | 562 | + |
| 2 | H | $C_6H_5$ | | Double bond | $CH_3$ | 135–140 | 563 | + |
| 2 | H | p-$CH_3$—$C_6H_4$ | | Double bond | $C_6H_5$ | 138–146 | 566 | + |
| 2 | H | o-Br—$C_6H_4$ | H | OH | $C_6H_5$ | 114–117 | 572 | +++ |
| 2 | H | $C_6H_5$ | H | OH | p-Br—$C_6H_4$ | 138–139 | 576 | ++ |
| 2 | H | $C_6H_5$ | | Double bond | p-Br—$C_6H_4$ | 169–174 | 577 | ++ |
| 2 | H | o-Br—$C_6H_4$ | | Doubel bond | $C_6H_5$ | 132–138 | 582 | ++ |
| 2 | H | $C_6H_5$ | | Double bond | 2'-thienyl | 155 | 592 | +++ |
| 2 | H | $C_6H_5$ | H | OH | 3'-$CH_3CONH$—$C_6H_4$ | 145–150 | 597 | ++ |
| 2 | H | $C_6H_5$ | H | OH | 3'-pyridyl | 115–117 | 598 | + |
| 2 | H | $C_6H_5$ | H | OH | 3'-$NO_2$—$C_6H_4$ | 144–146 | 599 | + |
| 2 | H | 3'-pyridyl | H | OH | $C_6H_5$ | 105–108 | 604 | + |
| 2 | H | $C_6H_5$ | | Double bond | 2'-HOOC—$C_6H_4$ | 210 | 610 | + |
| 2 | H | $C_6H_5$ | | Double bond | 4'-HO—$C_6H_4$ | 225 | 611 | ++ |
| 2 | $CH_3$ | $C_6H_5$ | | Double bond | $C_6H_5$ | 158–159 | 613 | + |
| 2 | H | $C_6H_5$ | | Double bond | 3'-$C_4H_9O$—$C_6H_4$ | 87 | 615 | + |
| 2 | H | 3',4',5'-$(CH_3O)_3$—$C_6H_2$ | | Double bond | $C_6H_5$ | 98–99 | 617 | ++ |
| 2 | H | $C_6H_5$ | H | OH | 3'-$FO_2S$—$C_6H_4$ | 150–152 | 640 | + |
| 2 | H | $C_6H_5$ | | Double bond | 4'-$C_2H_5OCOCH_2$—$C_6H_4$ | 128 | 648 | + |
| 2 | H | $C_6H_5$ | | Double bond | 3'-$FO_2S$—$C_6H_4$ | 152–153 | 650 | + |
| 2 | H | 2'-thienyl | | Double bond | $C_6H_5$ | 125–133 | 652 | ++ |
| 2 | H | $C_6H_5$ | | Double bond | 3'-$NO_2$—$C_6H_4$ | 114–116 | 675 | + |

Taking their anti-inflammatory activity into consideration, compounds (I) are useful in human therapeutics. For this purpose, they may be administered by any one of the conventional routes therefor, in admixture with the usual excipients suitable for such routes. A suitable daily dosage regimen is generally comprised between 300 and 1,500 mg. Thus, compounds (I) may be formulated, in particular, as tablets and suppositories containing each 50–300 mg. of active ingredient and administrable in a plurality of daily doses, according to the above mentioned daily dosage regimen.

Having now described by invention what I claim as new and desire to secure by Letters Patent is:

1. A compound selected from the group consisting of the compounds of formula:

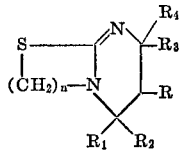

and their pharmaceutically acceptable acid addition salts, in which formula:

$n$ is an integer selected from 2 and 3, R and $R_3$ are selected from
  (a) R is hydrogen and $R_3$ is hydroxyl, and
  (b) R and $R_3$ form together a double bond, $R_1$ is selected from the group consisting of hydrogen and the lower alkyl groups, and $R_2$ and $R_4$ are each selected from the group consisting of hydrogen, the lower alkyl, phenyl, halophenyl, nitrophenyl, hydroxyphenyl, carboxyphenyl, halosulfonylphenyl, lower alkylphenyl, lower alkoxy phenyl, lower carbalkoxyalkylphenyl, lower alkanoylamidophenyl groups, thienyl and pyridyl.

2. 5,7 - diphenyl-7-hydroxy-2,3,5,6-tetrahydro-thiazolo (3.2.a)-pyrimidine and its pharmaceutically acceptable acid addition salts.

3. 5,7 - diphenyl-2,3,5-trihydro-thiazolo(3.2.a)-pyrimidine and its pharmaceutically acceptable acid addition salts.

4. 6,8 - diphenyl-2,3,4,6-tetrahydro-1,3-thiazine(3.2.a)-pyrimidine and its pharmaceutically acceptable acid addition salts.

5. 5 - (3' - chloro-phenyl)-7-phenyl-7-hydroxy-2,3,5,6-tetrahydro-thiazolo(3.2.a)pyrimidine and its pharmaceutically accepted acid addition salts.

6. 5 - phenyl - 7 - (2'-thienyl)-2,3,5-trihydro-thiazolo (3.2.a) - pyrimidine and its pharmaceutically acceptable acid addition salts.

References Cited

UNITED STATES PATENTS 3,551,426  12/1970  Manning _____ 260—251

OTHER REFERENCES

Joly et al.: Chemical Abstracts 74, 22792q (1971).

ALEX MAZEL, Primary Examiner

R. V. RUSH, Assistant Examiner

U.S. Cl. X.R.

260—251 A, 256.4 F, 256.5 R; 424—246, 251